Feb. 17, 1959 W. A. HORTON 2,873,645

PORTABLE SOUND RECORDING MOVING PICTURE APPARATUS

Filed May 23, 1957 3 Sheets-Sheet 1

INVENTOR
William A. Horton

BY Lancaster, Allen & Rommel
ATTORNEYS

PORTABLE SOUND RECORDING MOVING PICTURE APPARATUS

Filed May 23, 1957 3 Sheets-Sheet 2

INVENTOR
William A. Horton

BY Lancaster, Allwine & Rommel
ATTORNEYS

INVENTOR
William A. Horton

BY Lancaster, Allwine & Rommel
ATTORNEYS 2,873,645

PORTABLE SOUND RECORDING MOVING PICTURE APPARATUS

William A. Horton, Oklahoma City, Okla.

Application May 23, 1957, Serial No. 661,082
7 Claims. (Cl. 88—16)

This invention relates to improvements in portable sound recording moving picture apparatus.

The principal object of this invention is the provision of a completely mobile and independently operating unit that permits simultaneous moving picture and sound track recordings on film, utilizing no power source other than that included in the unit.

It is well known that silent motion picture apparatus is extremely mobile and it has always been the desire of news and TV camermen to have a camera which is capable of recording a sound track that would be as mobile as a silent motion picture camera. However, all sound recording motion picture apparatus requires an electrical power source and the problem has been to consolidate the power source and the sound recording motion picture apparatus into a compact unit so that it could be transported by one man and handled in a quick and easy manner. The provision of a power source has constituted the main problem. As many foreign countries provide electrical power varying from direct current to alternating current of 60 cycles to 150 cycles and as sound projectors operate at an exact speed with an exact amount of power it was impossible to make films in a foreign country utilizing the electrical power source. A sound truck has been used to transport the equipment required to make sound recordings at the same time the moving pictures were taken, however, this somewhat restricts the mobility of the sound recording moving picture apparatus and makes it impossible to take moving pictures and sound recordings simultaneously, except in places accessible to the sound truck. A further restriction upon the mobility of sound recording motion picture apparatus has occurred at various conventions where it has been necessary to string cables from electric outlets across aisles, etc., with the result that the apparatus is bulky and incapable of the desired degree of mobility. This invention makes it possible for one man, working alone, to do the heretofore impossible job of getting on the spot motion pictures and sound recordings under all conditions and regardless of the local condition of electrical power.

A further object is the provision of a shoulder saddle for supporting sound recording motion picture apparatus, including a power source.

A further object is the arrangement of the sound recording motion picture apparatus upon a shoulder saddle in such a manner so that the audio may be monitored by an earpiece and controlled by one hand and the camera can be aimed, steadied and actuated with the other hand. In other words, one hand aims and actuates while the other hand controls audio.

A further object is the provision of a camera support mounted upon a shoulder saddle permitting movement of the camera toward and away from the operator.

A further object is the provision of a balanced sound recording motion picture unit that is constructed so as to evenly balance the weight of the unit on either side of the operator's shoulder so that both hands are free to operate the camera and audio controls.

A further object is the provision of a trigger switch that eliminates the "howl" normally occurring at the beginning and ending of a film sound track recorded simultaneously with the taking of the picture. It has been found that the "howl" in ordinary sound picture taking is caused by having the sound recording light at full intensity before the camera is started, with the result that the sound is distorted as the camera picks up speed. When these "howls" occur in sound film, it is necessary to edit them out and to cut and patch the film, thus consuming a great deal of time. When minutes are important, for instance, in getting a film ready for a certain scheduled TV program, this delay is extremely vexing. Also, it is extremely important, in taking sound pictures, to be able to take a scene or a speech for a short time, shut down the camera for a short time, take another strip of film and sound to get, for instance, the point a speaker is making without having to take the entire speech, and then be able to put this directly onto a TV screen, showing it as a smoothly flowing picture while actually it is a condensed or fragmentary version of what occurred or what was said. In prior sound recording motion picture apparatus the elimination of this "howl" was unavoidable, as the operator had to first turn on the sound recording light in order to regulate the audio, according to the distance of the sound source from the microphone, the volume of the sound, etc., and then the switch operating the camera would be actuated, with resultant distortion of sound. Experiments have shown that when the sound recording light and camera motor are actuated simultaneously it requires approximately the same length of time, one-half second, for the camera to reach maximum speed and for the sound-recording light to reach maximum intensity, thus, recording sound and picture together as the camera reaches maximum speed. In the novel trigger arrangement herein provided a two stage switch is provided to attain this desirable result. The trigger is initially pressed for a short distance, into a first position, the amplifier and sound coil are actuated, but not the sound recording light, and the sound properly adjusted by the audio controls. The trigger is then depressed further to a second position at which time the sound recording light and camera are actuated simultaneously and the picture and sound recording are made. The sound recording light reaches maximum intensity at the same time as the camera reaches maximum speed, eliminating the unwanted "howl." When the trigger is released and sound is not recorded, only one frame, or one twenty-fourth second is required for the light to go out and the camera and sound recording light will stop at the same time.

Other objects and advantages of this invention will be apparent during the course of the following detailed description.

In the accompanying drawings, forming a part of this specification, and wherein similar reference characters designate corresponding parts throughout the several views.

Figures 1, 3:
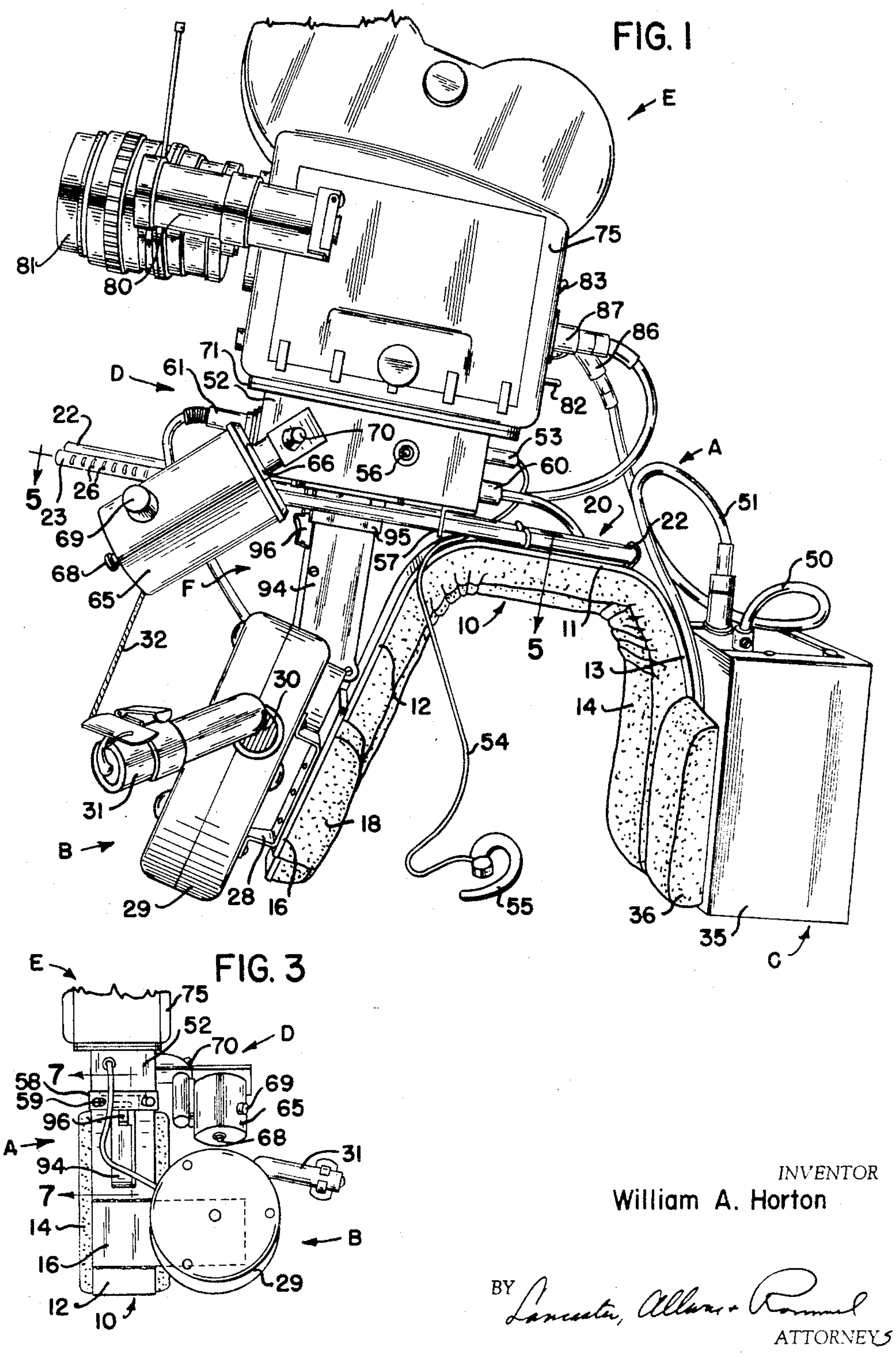
Fig. 1 is a perspective view of my improved portable sound recording moving picture apparatus.
Fig. 3 is a fragmentary front elevation of my improved apparatus.
Figures 2, 8:
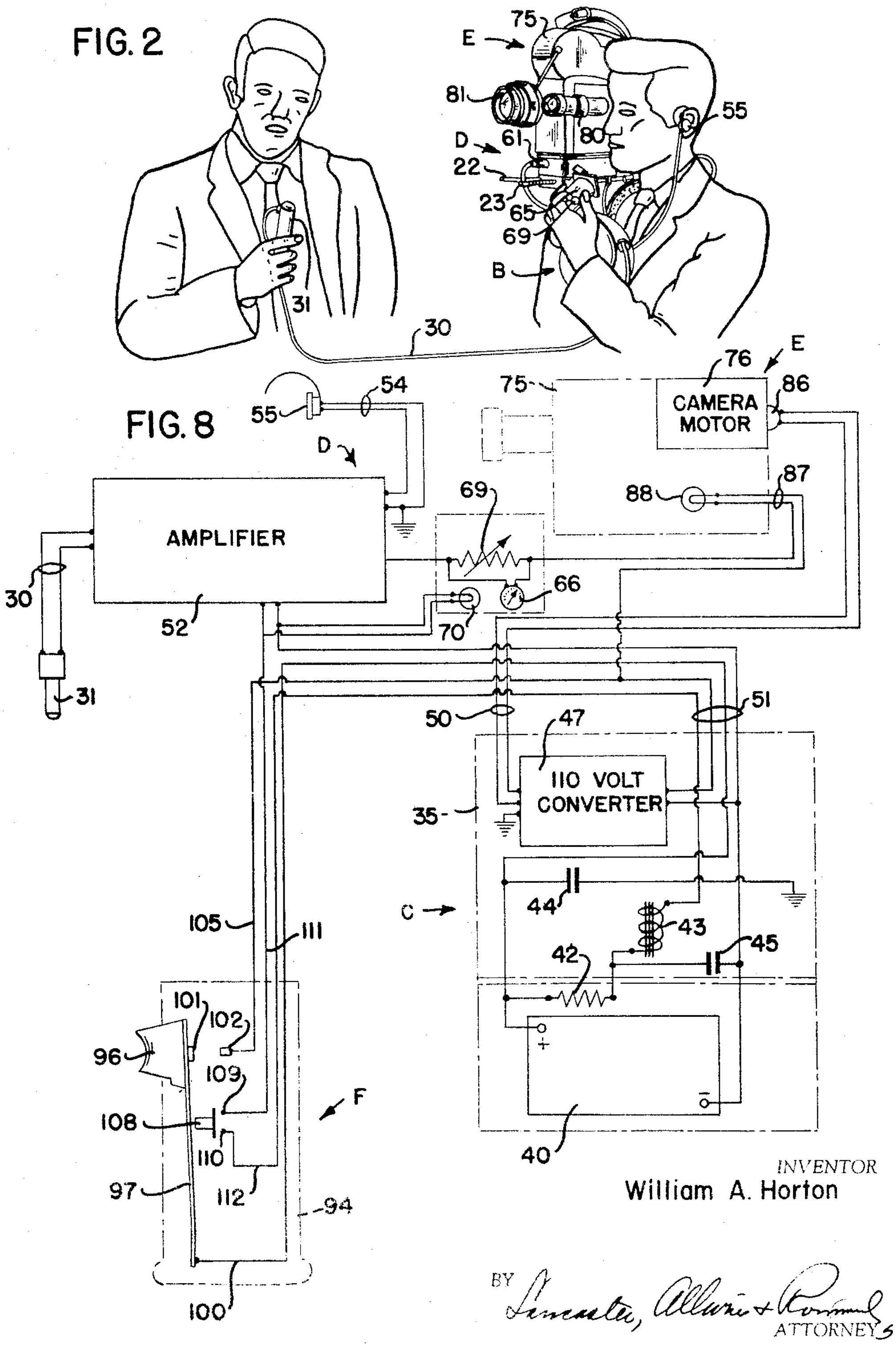
Fig. 2 is a perspective view of my improved apparatus in actual use.
Fig. 8 is a schematic diagram of the electrical components of my apparatus.

In the drawings, wherein for the purpose of illustration is shown a preferred form of the invention, A generally designates my improved shoulder saddle and camera support; B a microphone unit mounted upon the shoulder saddle; C a power source for the apparatus; D an amplifier and controls therefor; E a sound recording motion picture camera and F the power control for the apparatus.

The shoulder saddle and camera support A generally comprises a shoulder bracket 10 which is somewhat in the shape of a flattened U having an upper portion 11, a front depending flange 12 and rear depending flange 13. A pad 14, preferably of some resilient material, such as foam rubber, is disposed interiorly of the U-shaped bracket 10, forming a resilient surface for the mounting of the apparatus upon one shoulder of a cameraman.

A transversely extending plate 16 is welded or otherwise secured to the lowermost portion of the frontal depending flange 12, extending outwardly therefrom to one side, to which is secured the microphone unit B. The inner face of the plate 16 is provided with a resilient pad 18, of foam rubber, or some other resilient material, forming an additional support resting against the body of the cameraman.

A substantially U-shaped rod 20 is secured to the uppermost surface of the flattened portion 11 of the bracket 10, as by clips 22. The rod is positioned so that the bight portion of the U falls directly above the bracket 10 and legs 22 and 23 extend forwardly and outwardly past the bracket 10 and diverge slightly from each other for a purpose to be subsequently described. The legs 22 and 23 are provided with vertical notches or slots 25 and 26 respectively, along one outer side thereof, for positioning the camera E, in a manner to be subsequently described.

The microphone unit B is supported by a bracket 28 which is secured to the plate 16 mounted upon the shoulder bracket 10. The bracket 28 supports a reel 29 which contains a spring tensioned drum, not shown in the drawing, that automatically rewinds the microphone wire 30 upon the drum when tension is released upon any suitable type microphone 31. When the microphone wire 30 is fully wound upon the drum of the reel 29 an elastic cord 32 may be affixed to one end of the microphone and looped about one of the legs 22 or 23, holding the microphone in a stationary position. Reels of this sort are well known in the art and no further description of the reel is deemed necessary.

Power source C comprises an outer casing 35 which is welded, or otherwise secured directly to the lowermost portion of the downwardly depending flange 13 of the shoulder bracket 10. A resilient pad 36 may be provided upon the casing 35, adjacent the point where the casing might rub against the body of a cameraman, so that the power source will be resiliently supported away from the body of the cameraman. The casing 35 contains a storage battery 40, resistor 42, coil 43, condensers 44 and 45, quick detachable coupling 46, and 110 volt converter 47. The resistor 42, coil 43 and the two condensers 44 and 45 are provided within the electrical system to eliminate the 60 cycle hum from the 110 volt converter which would otherwise be transmitted to the sound track of the film. The entire apparatus contained within a casing 35 may be packed in sponge rubber 36 so that any vibration suffered by the apparatus will not be directly transmitted to the power source. Electrical outlet lines 50 and 51 lead from the power source to the camera and amplifier in a manner to be subsequently described.

The amplifier and audio controls D may generally comprise a standard transistor amplifier 52 which amplifies and transmits the sound from the microphone 31 to the camera E. An earphone outlet may be provided in the amplifier to receive an earphone jack 53 to which is attached a cord 54 and an earphone 55. A control 56 is provided on the amplifier for adjusting the intensity of the sound track lamp according to the emulsion type of film used. The amplifier is also provided with a collar 60 which receives the power supply line 51. An outlet for the microphone jack 61 is also provided for the transmission of sound from the microphone through the amplifier to the camera.

A visual sound indicating meter 65 is mounted upon one side of the amplifier 55. The meter contains a reading face 66 which indicates both the volume and the exposure of the sound track to the sound recording light. When it is desired to read the intensity of the exposure lamp recording the sound on the film, the button 68 at the lower portion of the meter 65 is pressed. A gain control 69 is provided on the meter for regulating the volume of sound on the sound coil in the camera. A light 70 may be provided to facilitate the reading of the meter in the dark.

Figures 4, 5, 6, 7:
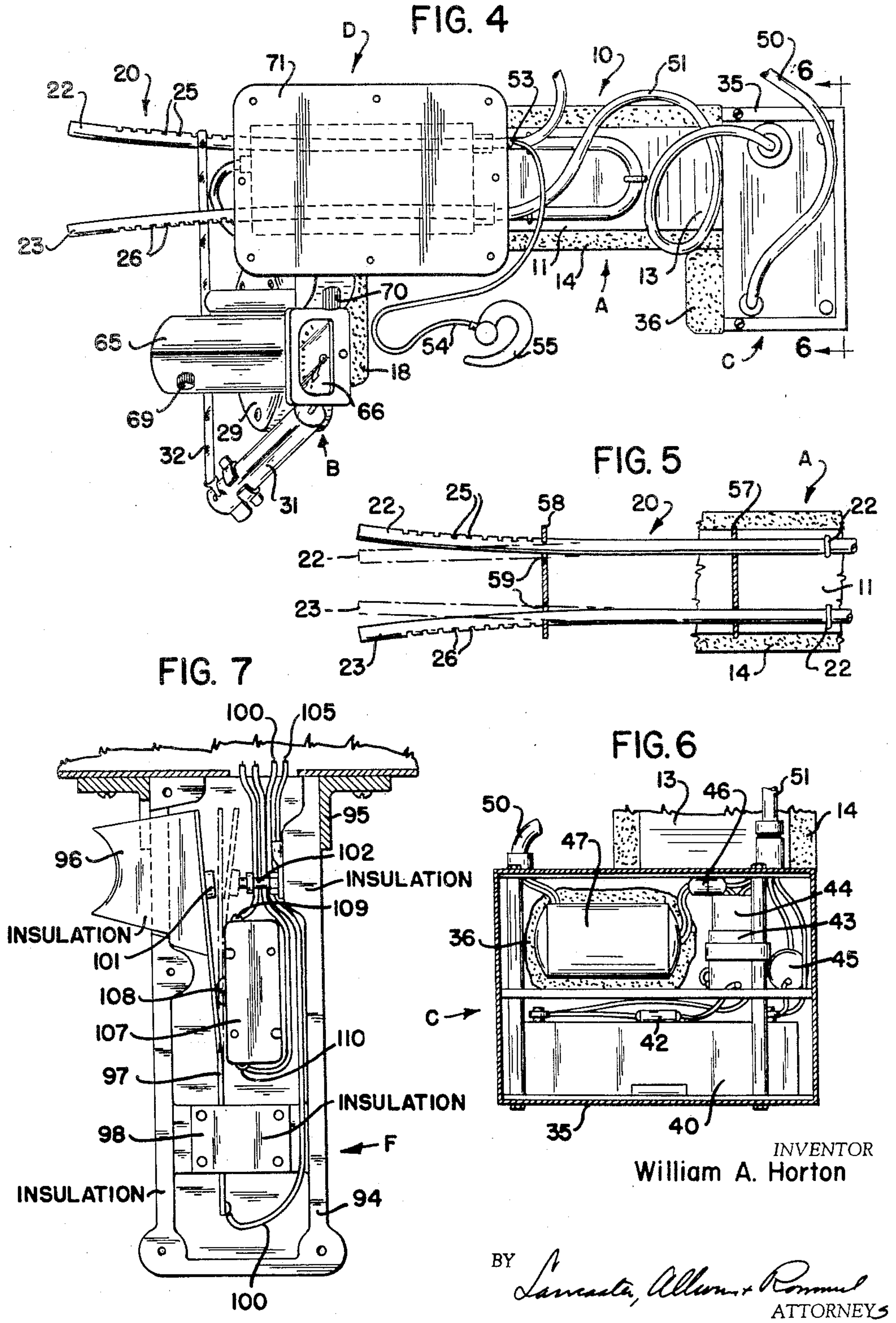
Fig. 4 is a top plan view of the apparatus of Fig. 1 with the camera removed.
Fig. 5 is a longitudinal sectional view taken substantially on the line 5—5 of Fig. 1.
Fig. 6 is a transverse sectional view taken substantially on the line 6—6 of Fig. 4.
Fig. 7 is a vertical sectional view taken substantially on the line 7—7 of Fig. 3.

The amplifier 55, upon which the camera is mounted, is provided with rear bracket 57 and front bracket 58 for mounting on the shoulder saddle. The rear bracket 57 fits about and slides upon the two legs 22 and 23 of the camera supporting rod 20. The front bracket 58 also fits about and slides upon the legs 22 and 23 of the camera supporting rod 20. The bracket 58 is provided with elongated openings 59 through which fit the legs 22 and 23 and permits compression of the legs 22 and 23 toward each other as illustrated in Fig. 5. It will be seen from Fig. 5 that the bracket 58 normally fits into the slots 25 and 26 on the diverging legs 22 and 23, holding the camera in a fixed position. When it is desired to move the camera either forwardly or rearwardly upon the legs 22 and 23 the legs are pushed toward each other in a manner shown in dot and dash lines in Fig. 5, the legs 22 and 23 moving in the elongated openings 59 and disengaging the slots 25 and 26 from the bracket 58, enabling forward or rearward movement of the camera.

The camera E is detachably secured to a plate 71 which is attached to the amplifier. I have found that an Auricon Cine-Voice Camera, such as that manufactured by Berndt-Bach, Inc., Hollywood, California is ideally constructed for utilization upon my improved apparatus. Camera E is provided with a conventional housing 75 which has therein the conventional mechanism necessary for the taking of motion pictures and sound tracks, including camera motor 76, finder lens 80 and lens 81. An on-off switch 82 is provided for turning the camera motor 76 on and off and a red warning light 83 may be provided to indicate when the camera motor is running. The camera casing is provided with two outlets, into which are plugged jacks 86 and 87 leading to the power source and amplifier respectively. A sound recording light 88 is provided within the camera for recording the sound upon the film.

The power control F comprises a pistol grip casing 94 secured to the amplifier 52 as by a bracket 95. This casing 94 is an electrical insulator and may be of any material that is a non-conductor. The casing 94 houses a trigger 96 supported upon a resilient metal arm or strip 97. The resilient metal arm or strip 97 is secured within an insulated housing 98 which is affixed internally of the casing 94. A power supply line 100 is secured to the lowermost end of the strip 97, leading to the power supply 40.

An electrical contact 101 is provided on the metal strip 97, immediately opposite the trigger 96. A cooperating contact 102 is mounted upon the housing 94 directly opposite the contact of 101, and has affixed thereto an electrical line 105 leading to the 110 volt converter 47. A micro switch 107, having a switch contact 108 adapted to be actuated by the strip 97, is provided internally of the casing 94. Outlets 109 and 110 are provided upon the micro switch 107, the outlet 109 having an electrical line 111 leading to the amplifier 52 and the outlet 110 having an electrical line 112 leading to the storage battery 40.

The operation of the camera is as follows:

The microphone 31 is disconnected from its holding elastic band 32 and is held by the speaker, the earphone 55 placed upon the cameraman's ear, the camera sighted and the trigger 96 is pressed into its first position. By first position I mean that the trigger 96 is depressed so that the micro switch 107 is actuated by depression of the button 108 by the strip 97, however the trigger 96 is not depressed to such an extent that the contacts 101 and 102 will meet. In this manner the micro switch alone is actuated. Upon the actuation of this micro switch 12 volt power is supplied to the amplifier and voice coil and the audio controls 65 are adjusted. Power is not supplied at this point to the sound recording lamp 88 and the camera motor 76. The volume may then be controlled by the gain control 69 and the amplifier warmed up without actuating the camera and sound recording light. After the sound has been regulated by the control 69, the trigger 96 is then depressed to a second position at which time the contacts 101 and 102 will engage and the sound recording light 88 and the camera motor will be actuated. The operator has completed, by the simple task of actuating the trigger three separate operations: (1) applied sound to the voice coil, (2) turned on the exposure lamp, (3) started the camera to roll. This simple movement of the trigger also eliminates the possibility of the camera being turned on inadvertently, leaving the sound track exposure off while taking pictures only, while the cameraman believes that he is getting sound with his picture whereas in reality he is not. Thus I provide for the elimination of the "howl" which occurs when the sound recording light is turned on prior to the actuation of the film, and have provided for adjustment of the volume prior to the turning on of the camera and sound recording light so that the camera and sound recording light both start at the same instant and both reach maximum speed and intensity respectively, eliminating the howl.

It will be understood that I may rearrange somewhat the exact mounting of my improved shoulder support, however the manner in which I have constructed this shoulder mount provides for an even balancing of the equipment so that it is easily supported and maintained in a balanced position upon the shoulder of a cameraman, leaving the cameraman's right hand free to aim and control the operation of the camera and the cameraman's left hand free to operate the controls of the camera.

While the cameraman is moving from place to place, he may press, with his left hand or arm, upon the front of the reel 29 which will in turn press the plate 16 and the pad 18 toward his chest and assist in keeping the apparatus in proper position on his body. This is especially advantageous when the cameraman is required to move quickly from place to place or crouch in order to position himself for the "take."

The depending flanges 12 and 13 of the shoulder saddle 10, the reel 29 and the casing 35 of the power source C form a stable base for supporting the apparatus on the ground, a table, etc., when it is taken off of the cameraman's shoulder without likelihood of its falling over and causing damage to the apparatus.

Various changes in the shape, size and arrangements of parts may be made to the form of invention herein shown and described without departing from the spirit of the invention and the scope of the claims.

I claim:

1. Apparatus for the supporting of a portable camera unit by an operator comprising a saddle shaped to fit over a portion of the operator's body and having a camera supporting portion; a camera support mounted upon said camera supporting portion of said saddle, said camera support comprising a pair of outwardly extending rods having spaced vertical notches at the outermost sides thereof, said pair of rods diverging slightly outwardly away from each other at their outermost ends and being of a somewhat flexible material so that they can be compressed into a substantially parallel position; and a camera mounting supported by said rods, said camera mounting comprising a pair of brackets having apertures therethrough for receiving said rods, the rearmost of said brackets sliding freely upon said rods and the foremost of said brackets positioned so as to engage the vertical notches provided at the outermost sides of said rods, the apertures through the foremost bracket being substantially elongated so that said rods can be compressed inwardly toward each other, in a parallel relationship, disengaging the rods from the foremost bracket, permitting free sliding movement of the camera mounting upon the camera support when the rods are so compressed.

2. In apparatus for the portable support of sound recording moving picture equipment, the combination of moving picture equipment including a sound recording camera, a microphone unit, an amplifier, and a power supply, all of said equipment being interconnected in an operable manner; and a shoulder bracket shaped to fit over one shoulder of an operator, said shoulder bracket having an upper portion and downwardly depending front and rear portions, said power supply being mounted upon said rear portion of said bracket and having its weight distributed to the rear of said bracket, said microphone unit being mounted upon said front portion of said bracket and having its weight distributed to the front of said bracket, said amplifier being mounted upon the upper portion of said bracket and extending over said front portion of said bracket with its weight distributed to the front of said bracket, and a camera mounted upon said amplifier and extending over said front portion of said bracket with its weight distributed to the front of said bracket, such distribution of weight locating the center of gravity of the motion picture equipment over the upper portion of said shoulder bracket and providing an evenly balanced shoulder supported portable unit.

3. The combination as described in claim 2 wherein the lowermost portions of the depending front and rear portions of the shoulder bracket, microphone unit and power supply are in substantially the same plane forming a stable support for the apparatus when it is not in position upon an operator's shoulder.

4. The combination as described in claim 2 wherein said microphone unit and said power supply extend outwardly from the sides of the front and rear portions of said shoulder bracket, respectively, forming surfaces that are substantially projections of the front and rear portions of the shoulder bracket, thus broadening the pressure points of the front and rear portions of said shoulder brackets at their points of contact with the body of an operator.

5. The combination as described in claim 2 wherein said amplifier is provided with a visual sound indicating meter mounted on the side thereof, the face of said meter being disposed forwardly of the front portion of said shoulder bracket and positioned so that it can be easily read by the operator when the apparatus is in its shoulder supported position.

6. In apparatus for the portable support of sound recording moving picture equipment the combination of moving picture equipment including a sound recording camera, a microphone unit, an amplifier, and a power supply, all of said equipment interconnected in an operable manner; a shoulder bracket shaped to fit over one shoulder of an operator, said shoulder bracket having an upper portion and downwardly depending front and rear portions, said power supply being mounted upon said rear portion of said shoulder bracket and having its weight distributed to the rear of said shoulder bracket, said microphone unit being mounted upon said front portion of said shoulder bracket and having its weight distributed to the front of said shoulder bracket; and a camera support mounted upon the upper portion of said shoulder bracket, said camera support comprising a pair of outwardly extending rods having spaced vertical notches at the outermost sides thereof, said pair of rods diverging slightly outwardly away from each other at their outermost ends and being of a somewhat flexible material so that they can be compressed into a substantially parallel position, said pair of rods extending over and forwardly of said front portion of said shoulder bracket, and a camera mounting supported by said rods, said camera mounting comprising a pair of brackets having apertures therethrough for receiving said rods, the rearmost of said brackets sliding freely upon said rods and the foremost portion of said brackets positioned so as to engage the vertical notches provided at the outermost sides of said rods, the apertures through the foremost bracket being substantially elongated so that said rods can be compressed inwardly toward each other, in a parallel relationship disengaging the rods from the foremost bracket, permitting free sliding movement of the camera mounting upon the camera support, said amplifier being mounted upon said brackets and extending over said front portion of said shoulder bracket with its weight distributed to the front of said shoulder bracket, and a camera mounted upon said amplifier and extending over said front portion of said shoulder bracket with its weight distributed to the front of said shoulder bracket, such distribution of weight locating the center of gravity of the motion picture equipment over the upper portion of said shoulder bracket as the camera mounting is slid along said rods, providing an evenly balanced shoulder supported portable unit.

7. The combination as specified in claim 6 wherein a grip depends downwardly from said amplifier for the facile aiming and moving of the camera along said rods, said grip including a control trigger for the actuation of the sound recording moving picture equipment concurrently with the movement of the camera.

References Cited in the file of this patent

UNITED STATES PATENTS

| | | |
|---|---|---|
| 1,815,481 | Owens | July 21, 1931 |
| 2,031,809 | Zimmerman | Feb. 25, 1936 |
| 2,074,049 | Dimmick | Mar. 16, 1937 |
| 2,452,830 | Braun | Nov. 2, 1948 |
| 2,482,676 | Lanter | Sept. 20, 1949 |
| 2,603,134 | Burnam | July 15, 1954 |
| 2,746,369 | Beard et al. | May 22, 1956 |
| 2,753,778 | Tolcher | July 10, 1956 |

FOREIGN PATENTS

| | | |
|---|---|---|
| 590,561 | France | Nov. 29, 1924 |